Nov. 25, 1924.

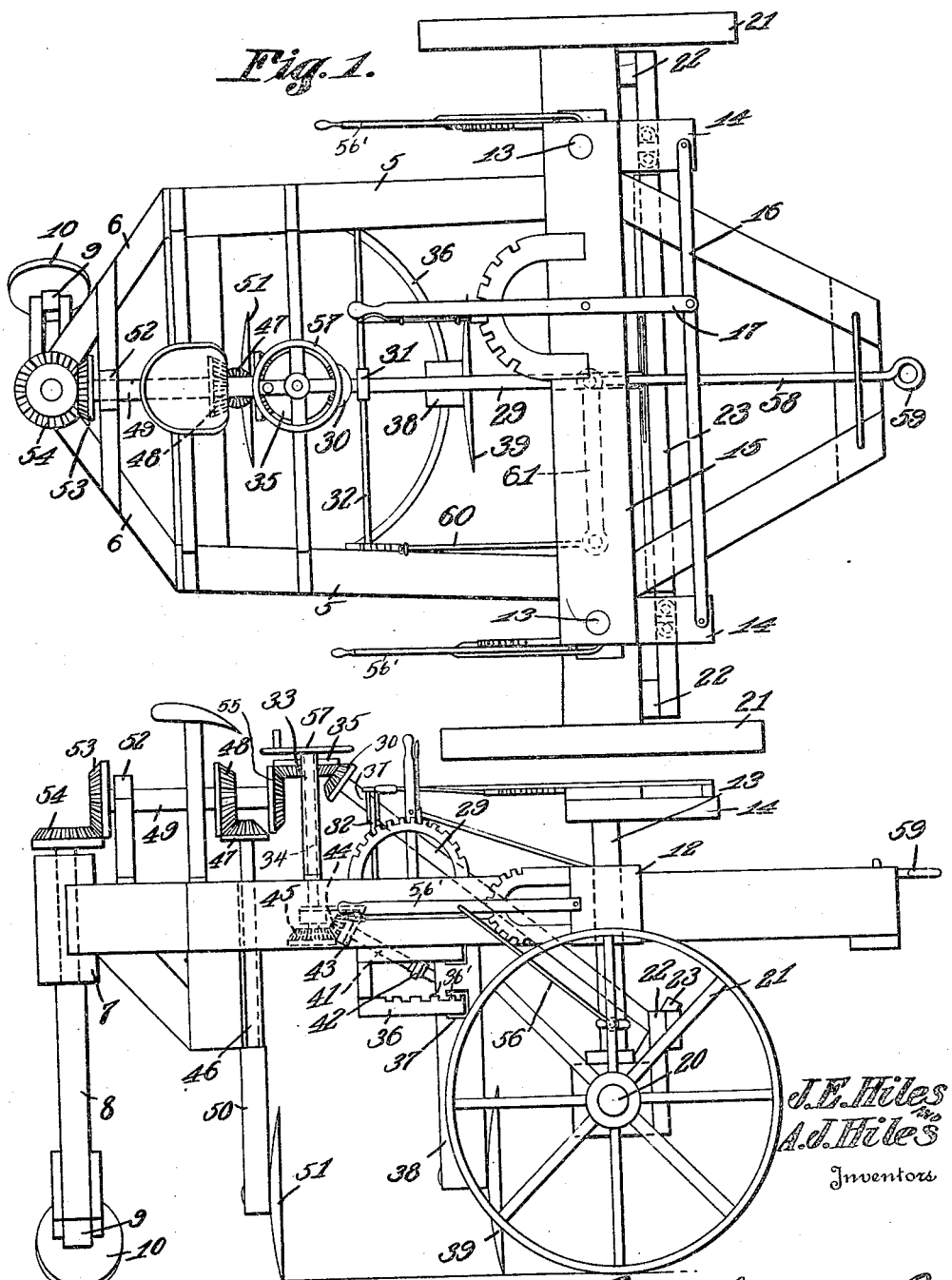

J. E. HILES ET AL

PLOW

Filed June 14, 1922

J. E. Hiles
A. J. Hiles
Inventors

By ⟨signature⟩
Attorney

Patented Nov. 25, 1924.

1,516,729

UNITED STATES PATENT OFFICE.

JOHN E. HILES AND ARTHUR J. HILES, OF MISSOURI VALLEY, IOWA.

PLOW.

Application filed June 14, 1922. Serial No. 568,188.

*To all whom it may concern:*

Be it known that we, JOHN E. HILES and ARTHUR J. HILES, citizens of the United States, residing at Missouri Valley, in the county of Harrison, State of Iowa, have invented a new and useful Plow, of which the following is a specification.

This invention relates to plows and more particularly to plows of the gang disk type designed to be used on side hills. the primary object of the invention being to provide a plow of this type, wherein the disks may be reversed with respect to the frame of the plow.

Another object of the invention is to provide means for supporting the wheels of the plow, whereby the same may be moved to raise or lower one side of the machine with respect to the other side.

A still further object of the invention is the provision of means for controlling the disk plows as well as the movements of the wheels to adjust the same, from a point in proximity to the operator's seat, thereby providing a plow of the one-man type.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a plowing machine constructed in accordance with the present invention.

Figure 2 is a side elevational view of the machine.

Figure 3:
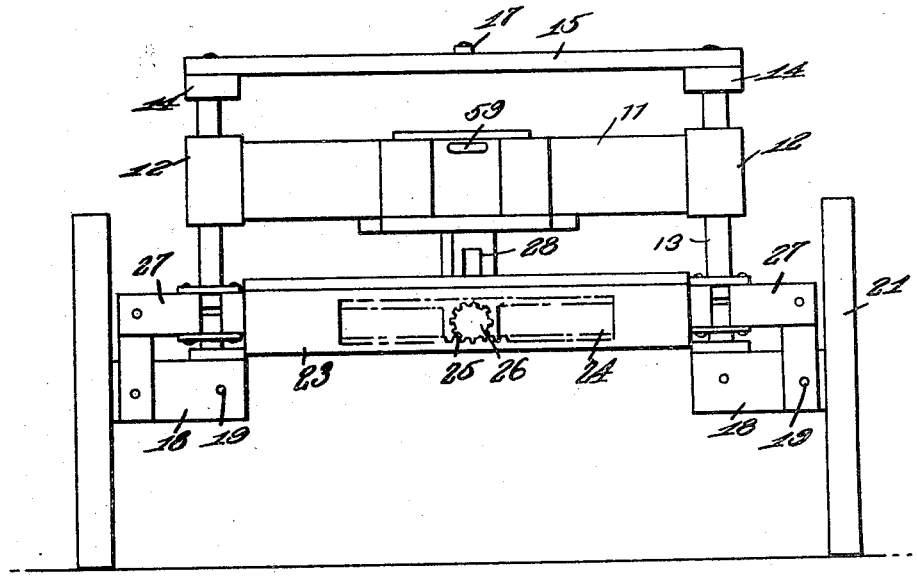
Figure 3 is a rear elevational view of the machine.
Figure 4:
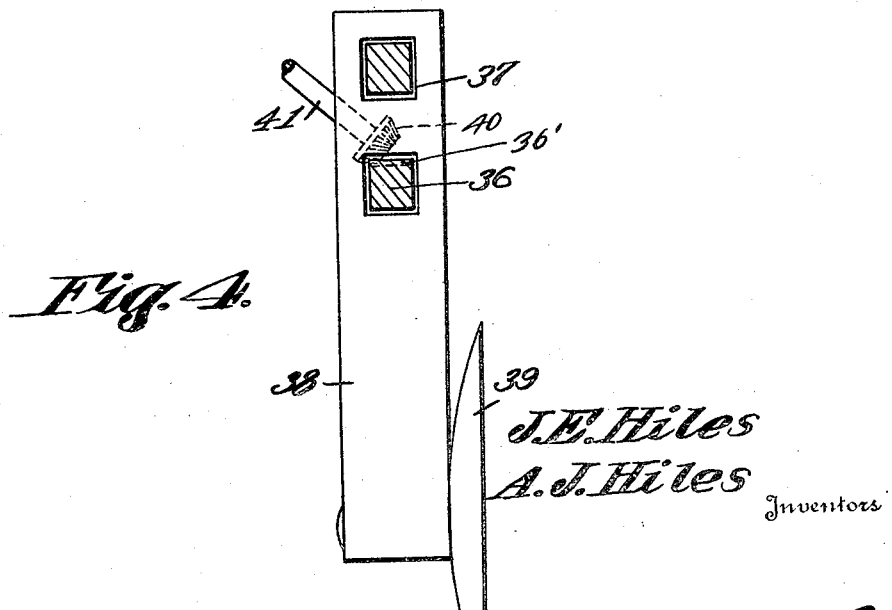
Figure 4 is a sectional view taken through the curved plow beam support.

Referring to the drawings in detail, the reference character 5 designates the frame of the machine, which includes rearwardly extended bars 6 that have connection with the bearing member 7 for supporting the same.

Extending through the bearing member is a vertical shaft 8 which has connection with the angularly disposed shaft 9 on which the guiding wheel 10 is mounted, the structure of the shaft and bar 9 being such as to support the wheel 10 at an angle.

A transverse bar 11 forms a part of the machine, and is disposed at the forward end thereof, bearing members 12 being secured to the frame 5 adjacent to the ends of the bar 11, where the same support the vertical shafts 13 that have arms 14 secured thereto.

The upper ends of the shafts 13 extend above the frame, where the same are connected by means of the connecting bar 15, which bar holds the upper ends of the shafts in spaced relation with each other. The arms 14 have their forward ends connected as by means of the bar 16, which bar has pivotal connection with the controlling lever 17 so that movement of the controlling lever will move the shafts 13 accordingly.

Heads 18 have connection with the lower ends of the shafts 13 as by means of the pivot pins 19, the heads being designed to move in vertical planes to adjust the frame with respect to the ground surface over which the same is moving. Each of the heads is formed with an axle 20 on which the wheels 21 are positioned. Extending upwardly from each head, is a bar 22, which bars have pivotal connection with the horizontally disposed bar 23 which is formed with an elongated opening 24 provided with teeth 25 on one wall thereof, which teeth mesh with the teeth of the gear 26. At the ends of the bar 23 are pivoted bars 27 that have pivotal connection with the bars 22, as clearly shown by Figure 3 of the drawings.

Secured to the frame and extending downwardly therefrom is a supporting member 28 in which is formed an opening to accommodate the shaft 29 that carries a beveled pinion 30 at the upper end thereof, the upper or rear end of the shaft being supported in the bearing 31 supported by the rods 32 that connect with the side rails of the frame of the machine.

A supporting frame indicated generally by the reference character 33 is supported by the side rails of the frame and provides a support for the vertical shaft 34 that carries a beveled pinion 35 meshing with the beveled pinion 30, so that movement of the pinion 35 results in a relative movement of the shaft 29 to move the bar 23 laterally to tilt the supporting wheels 21 in the same direction to the end that one side of the frame is raised and the other side lowered, thereby adapting the device for use on side hills.

Supported under the frame is a curved support 36 which is in the form of spaced bars, which bars are positioned in the opening 37 of the vertical bar 38 that carries the disk plow 39, at the lower end thereof. The lower bar of the support 36 is formed with teeth 36' adapted to mesh with the teeth of the pinion 40 that is connected with the shaft 41 as by means of the universal joint 42, the shaft 41 having its opposite end supported in the bearing member 43, and carries the pinion 44 on the upper end thereof.

This pinion 44 meshes with the pinion 45 carried at the lower end of the shaft 34 so that movement of the pinion 45 transmits motion to the shaft 41 and pinion 40 to the end that the bar 38 is moved along the support 36 to reverse the disk plow 39 carried at the lower end thereof. A vertical shaft 46 is supported with the rear end of the machine and carries a beveled pinion at the upper end thereof, which beveled pinion 47 meshes with the beveled pinion 48 keyed or otherwise secured to the shaft 49.

An enlargement 50 is formed at the lower end of the shaft 46 and provides a support for the disk 51, which disk may be adjusted to operate at various angles with respect to the frame, by rotating the shaft 46.

A bearing 52 is mounted on the frame and supports the shaft 49 which in turn carries the pinion 53. The pinion 53 meshes with the pinion 54 carried at the upper end of the shaft 8, so that rotary movement is imparted to the shaft 8 through the pinions 53 and 54 to accomplish the guiding of the machine.

At the forward end of shaft 49 is a pinion 55 that meshes with the pinion 35 so that rotary movement of the pinion 35 is transmitted to the pinion 55 to move the wheel 10 accordingly. The shafts 13 are supported in the bearings 12 to move vertically therethrough. Secured to the shafts 13 are rods 56 that have connection with levers 56', so that by adjusting the levers 56' the shafts may be moved or adjusted independently of each other, to elevate or lower the sides of the frame of the machine. On the upper end of the shaft 34 is a controlling wheel 57 which may be operated to rotate the various shafts simultaneously so that when the shaft 8 is moved to move the wheel 10 to the opposite side of the frame, the plows are simultaneously moved to the opposite side of the machine.

It might be further stated that the machine is especially designed for use in connection with a tractor or the like, and to this end a coupling bar 58 is provided at the forward end of the machine, which coupling bar is formed with an eye 59 to be connected to the tractor in any suitable or well known manner. An operating rod 60 has connection with one end of the arm 61 that is secured to one end of the rod 58, so that the coupling may be manually controlled to guide the machine.

Having thus described the invention, what is claimed as new is:—

In a machine of the class described, a frame, curved supporting members disposed under the frame, one of said supporting members having teeth, a vertical plow supporting beam having openings to receive the supporting members, a shaft extending into the beam and carrying a pinion, said pinion adapted to mesh with the teeth of the supporting member, said pinion adapted to rotate to move the beam laterally of the frame, and means for guiding the machine.

In testimony that we claim the foregoing as our own, we have hereto affixed our signatures in the presence of two witnesses.

JOHN E. HILES.
ARTHUR J. HILES.

Witnesses:
W. J. BURKE,
J. G. ZUVER.